United States Patent Office 3,090,633
Patented May 21, 1963

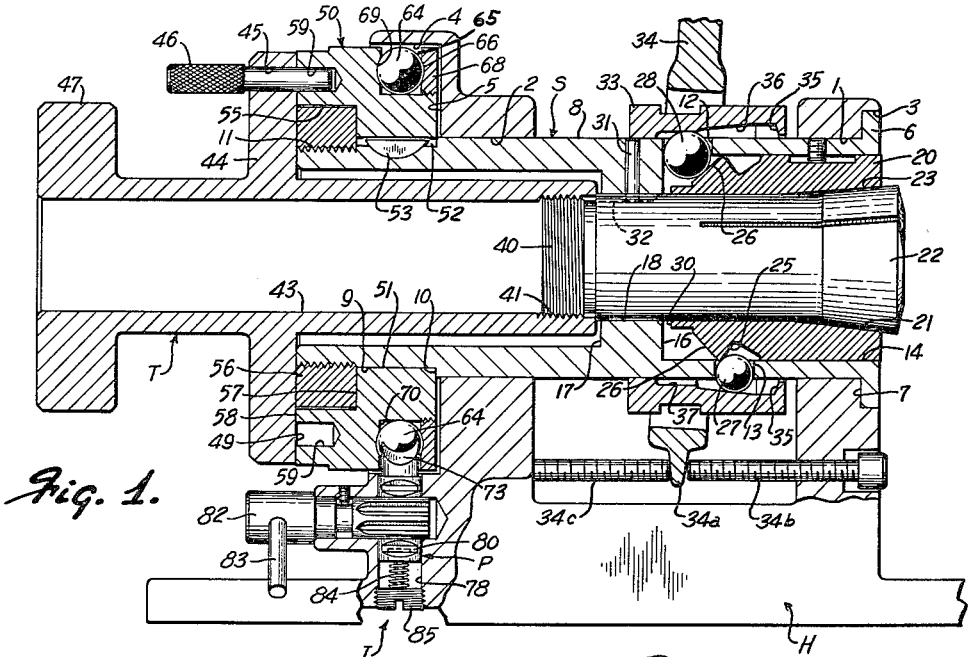

3,090,633
INDEX MECHANISM FOR CHUCKS
Lawrence Farnsworth, Racine, Wis., assignor of one-half to Max M. Seft, Racine, Wis.
Filed Apr. 26, 1962, Ser. No. 190,403
9 Claims. (Cl. 279—5)

This invention relates generally to chucks for holding workpieces that are to be machined, and more specifically relates to an improved indexing mechanism for such chucks.

In the operation of such chucks, it is necessary at times to successively index the workpiece through various angular increments, such as, for example, when milling a series of flat sides around the periphery of the workpiece. This repeated indexing should not only be accomplished rapidly and easily, but also with a great deal of accuracy and preferably without danger of a miscalculation on the part of the machinist.

Accordingly, the present invention provides an improved indexing mechanism for chucks which is accurate in indexing the workpiece, quick and easy to operate, and easily understood and set by the machinist.

A more limited aspect of the invention relates to a mechanism of the above type which includes means for adjusting the gripping pressure of the chuck collet without disturbing the setting of the indexing feature of the mechanism.

In addition to the high degree of accuracy provided by the indexing mechanism of the present invention, the mechanism is economical to manufacture and durable in use.

These and other objects and advantages of the present invention will appear as this disclosure progresses, reference being had to the accompanying drawings, in which:

FIGURE 1 is a longitudinal, elevational, cross-sectional view of a chuck embodying the present invention, with parts broken away;

FIGURE 2 is a side elevational view of the spindle shown in FIGURE 1, but on a reduced scale;

FIGURE 3 is an exploded, perspective view of the chuck shown in FIGURE 1, but on a reduced scale, and with some parts broken away or not shown for the sake of clarity, and FIGURE 4 is an enlarged, fragmentary, axial view showing the plunger of FIGURE 1 inserted in the operative position.

Referring in greater detail to the drawings, a base or housing H is provided and can be fastened in any suitable manner to a machine or other support (not shown) with which it is to be used. A tubular spindle S is rotatably mounted in the axially spaced apart and aligned openings 1 and 2 in the housing. A front counterbore 3 is formed adjacent front opening 1, and a rear counterbore 4 is formed adjacent rear opening 2 in the housing and forms a radial shoulder 5 therebetween.

The spindle S has a radial flange 6 at its front end and which nests in the front counterbore 3 and limits rearward movement of the spindle in the housing by abutting against the shoulder 7 located between the bores 1 and 3. The diameter of the major portion 8 of the length of the spindle is such that it forms a smooth running fit with and in openings 1 and 2. A rear portion 9 of reduced diameter forms a shoulder 10 with portion 8. The rear end 11 of the spindle is externally threaded to receive the indexing mechanism I, as will appear, for tight engagement and rotation therewith.

The spindle has three circumferentially spaced openings 12 extending through its wall. A pair of diametrically opposed openings 13 also extend through the wall of the spindle and are axially spaced from the larger openings 12. The internal configuration of the spindle is formed by a larger forward bore 14, a smaller rear bore 15, radial shoulders 16 and 17, and an intermediate bore 18.

A collet closer in the form of sleeve 20 is mounted for limited axial movement within the bore 14 and has an internally tapered surface 21.

A conventional spring jaw collet 22 is mounted within sleeve 20, and the collet has an externally tapered surface 23 which complements the closer surface 21.

Forward axial movement (to the right as viewed in FIGURE 1) of the closer causes the spring jaws of the collet to close radially in a well-known manner, while rearward movement of the closer permits the spring jaws to open.

A pair of oppositely inclined cam surfaces 25 and 26 are formed externally on the closer and are engageable, respectively, by the balls 27 and 28 mounted, respectively, in openings 13 and 12 in the spindle. The rear end 30 of the closer is abuttable against the shoulder 16 of the spindle and is thereby limited in its rearward movement within the spindle.

Relative rotation between the spindle and collet is prevented by pin 31 (FIGURE 1) extending through the spindle and into the slot 32 in the collet. This permits adjustment of the collet gripping pressure, as will appear later.

The spindle, the closer, and its collet can be considered to be a spindle assembly.

Collet Actuating Means

An actuating collar 33 is axially slidable on the spindle by means of the actuating lever 34 which is pivoted at 34a between the aligned set screws 34b and 34c. A pair of camming surfaces 35 and 36 are formed around the internal surface of the actuating collar and are adapted to abut against, respectively, the balls 27 and 28, for forcing the latter radially inwardly against their respective camming surfaces on the collet closer.

If a more complete description of the function of the actuating collar and its associated parts is thought to be necessary or desirable, reference may be had to my co-pending application, Serial No. 127,630, filed July 28, 1961. It is believed sufficient to say for purposes of this disclosure, however, that when the actuating lever 34 shifts the collar in an axial direction forwardly (to the right in FIGURE 1), the internal camming surface 36 of the collar abuts against the balls 28 to thereby urge them against the cam surface 26 of the closer. This in turn forces the closer forwardly, thus closing the jaws of the collet. At this time, the balls 28 ride on the level surface 37 of the actuator, and the collet remains in the locked position without continuing attention of the operator.

Rearward swinging of the lever 34 causes the actuator 33 to be shifted to the rear, thus forcing camming surface 35 against balls 27 which in turn bear against the cam surface 25 of the closer, thus shoving the latter rearwardly and permitting the spring jaws of the collet to open.

Gripping Adjustment for Collet

The rear end 40 of the collet is externally threaded in the conventional manner and is thereby securable to an internally threaded portion 41 of the collet grip adjusting means T. This means comprises a tubular portion 43 on which is integrally formed a large radial flange 44. A longitudinal aperture 45 extends through the flange 44 and in which a locking pin 46 is slidably mounted for purposes that will hereinafter appear. The rearmost end 47 of the tension adjusting member T is knurled to permit ready gripping by the operator, whereby the member T may be manually rotated to any adjusted position, as will appear, to thereby axially shift the collet that is threadably engaged therewith. The collet, during adjustment, is prevented from rotating by the pin 31 in slot 32.

In this manner, the collet is forced to move in one axial direction or another and thereby permit adjustment of the gripping pressure of the collet by changing slightly the relative position of the complementary tapered surfaces of the collet and its actuator. The transverse surface 49 (FIGURE 1) of the tension adjusting member T is adapted to bear against the index mechanism I when the unit is assembled.

Adjustment of the collet gripping pressure does not affect the index setting, as will appear.

Index Mechanism

The index mechanism provided by the present invention comprises a cylindrical collar 50 having a center bore 51 that fits snugly on the reduced diametrical portion 9 of the spindle. A keyway 52 in bore 51 registers with a key 53 on the spindle and thereby relative rotation between the spindle and the index mechanism is prevented.

The radial surface 54 of the index mechanism abuts against the radial shoulder 10 of the spindle when a take-up ring 56 is threaded tightly on the spindle and bears against the shoulder 57 inside the mechanism I. A clearance is provided, however, between the index member and the housing.

The take-up ring functions to take up all of the axial play of the parts and holds the mechanism I securely on the spindle for rotation therewith.

It will be noted that the take-up ring 56 fits within the counterbore 55 formed in the rear side of the cylindrical collar 50 of the index mechanism.

Circumferentially around the rear transverse surface 58 of the mechanism I are formed a series of equally spaced and axially extending holes 59. The collet gripping adjusting pin 46 is insertable selectively in any one of the holes 59 when the adjusting member T is rotated by the operator to any selected position. Thus, the pin 46 engages with the index mechanism to hold the tension mechanism T in any one of its adjusted positions.

In accordance with the present invention, means are provided around the periphery of the index mechanism for accurately dividing its periphery into equal parts. This means comprises a series of hardened steel balls 64 which abut tightly against one another and extend completely around an annular and outwardly facing groove 65 formed in the index member. It will be noted that the external diameter defined by the balls on the mechanism permits the balls to be inserted within the counter-bore 4 in the housing.

The groove 65 is defined by its side walls 67 and 70.

The balls are rigidly held within the groove 65 and prevented from moving radially by means of an annular recess 66 formed in the side wall 67 of a ring 68. This ring is actually formed as a separate piece from the rest of the index mechanism and has internal threads by means of which it is threadably engaged on the front side of the mechanism. Thus, the ring 68 is tightened against the balls, and the latter seat tightly in the recess 66. A similar recess 69 may be formed in the other side wall 70 of the groove and thus also form a seat for the balls.

The balls cannot shift either radially or circumferentially but instead form a fixed part of the index mechanism.

As previously indicated, the diameter of the recesses 66 and 69 is such that the balls 64 tightly abut against one another, and in the embodiment shown, 24 balls are provided so as to divide the index mechanism circumferentially into 24 units.

Index Indicia

Around the periphery of the index mechanism, index marks 71 are provided and which are correlated to the balls 64, preferably one mark being provided for each ball. Adjacent one of these marks is located the zero or reference point 0, and this is the starting point for any indexing operation.

Numerical indicia are also provided around the periphery of the index mechanism and correlated with the marks 71 for enabling the operator to quickly index the mark for the workpiece through any degree of angular movement.

For example, if the operator desires to index the workpiece into four equally divided angular positions, he would use the number 4 which appears in three places on the periphery. In other words, the numbers 4 and the zero reference 0 are spaced apart 90 degrees from one another, and after the first operation at the zero reference location, the operator withdraws the plunger P, to be described, and then rotates the index mechanism to the next number 4. The operation is repeated in all number 4 locations.

Similarly, if the operator desires to index the unit into three equal parts for one complete rotation, after performing the operation at the zero setting, he would then rotate the index mechanism successively to each of the two reference numerals 3 appearing on the periphery of the index mechanism. Stated otherwise, the zero reference and the numeral 3 are spaced precisely 33⅓ degrees apart.

Other angular indexing positions can be indicated on the periphery of the unit, as desired.

Index Locking Means

The inner end of the plunger P is rather sharp so as to be insertable snugly between adjacent balls. Furthermore, the plunger end is formed of two converging and generally concave surfaces 73 and 74 (FIGURE 4) which complement and can abut against the curved surfaces of the adjacent balls. With such a shape, the operator need not move the index marks in exact alignment with the reference mark 77 on the housing, because the plunger is spring loaded and will be driven between the proper pair of balls, thus centering the index mechanism exactly.

The plunger P is slidably mounted in a bore 78 in the housing and can be easily and rapidly withdrawn from between the balls, when it is desired to reset the mechanism, as follows.

Along one side of the plunger is formed a gear rack 80. An elongated gear member 82 is in constant mesh with the rack and extends outwardly of the housing where it has an operating lever 83 secured thereto. Rotation of the lever in the direction indicated by the arrow in the drawings causes the plunger to shift in its bore and be withdrawn from between the balls. A spring 84 is located in the bore 78 and bears against the plunger to urge it toward its inserted position between a pair of balls. A threaded plug 85 is engaged in the threaded end of the bore and holds the spring and plunger in assembled position.

In operation, to index the workpiece, it is only necessary for the operator to push against the lever 83, in the direction indicated by the arrow, and then with his other hand rotate the index mechanism to the selected position. Upon release of the lever, the plunger is urged tightly into its wedging position between the proper pair of balls, thus rigidly holding the mechanism in its adjusted position.

General

The hardened steel balls which are rigidly mounted around the periphery of the index member form a particularly accurate division of the indexing mechanism. These balls are capable of withstanding a considerable amount of use without wear which would otherwise result in an inaccurate gauging device. The mechanism is easily assembled, it being necessary only to screw the ring 68 tightly against the balls to rigidly hold them in place. The balls themselves are relatively inexpensive, and no complicated machining of indexing positions is required.

The particular plunger utilized with the present invention is easily operated and automatically returned to position and furthermore acts to center the mechanism exactly on the proper reference mark, and it is unnecessary for the operator to visually observe with any degree of accuracy whether the reference marks are in alignment.

The holes 59 in the rear end of the index mechanism and the removable locking pin 46 on the collet adjusting member provide interengaging and releasable means for quick adjustment of collet gripping pressure by rotating the adjusting means T relative to the indexing mechanism, and to do so does not disturb the index setting.

It is a simple matter for the operator to interpret the indicia on the index mechanism; for example, if he knows he must divide the workpiece into four equal angular relationships (after the first operation has been performed at the zero reference mark), he simply successively indexes using only the reference numbers 4 located around the periphery of the mechanism.

Various modes of carrying out the invention are contemplated as being within the scope of the following claims particularly pointing out and distinctly claiming the subject matter which is regarded as the invention.

I claim:

1. An index mechanism for a chuck of the type having a housing and a spindle assembly rotatably mounted in said housing and adapted to grip a workpiece for rotation therewith, said mechanism comprising; a generally cylindrical member secured to said spindle assembly, a series of balls rigidly mounted circumferentially around said member with adjacent balls abutting against one another to form a generally V-shaped space between each pair of adjacent balls, and a plunger shiftably mounted on said housing and having a portion insertable tightly into said space between adjacent balls and into engagement therewith to thereby prevent rotation of said mechanism and assembly relative to said housing.

2. An index mechanism for a chuck of the type having a housing and a spindle assembly rotatably mounted in said housing and adapted to grip a workpiece for rotation therewith, said mechanism comprising; a generally cylindrical member rigidly secured to said spindle assembly and having a groove formed around its periphery, a series of balls rigidly mounted in said groove and with adjacent balls abutting against one another, and a plunger shiftably mounted on said housing and having a portion insertable tightly between and against adjacent balls to thereby prevent rotation of said assembly relative to said housing.

3. An index mechanism for a chuck of the type having a housing and a spindle assembly rotatably mounted in said housing and adapted to grip a workpiece for rotation therewith, said mechanism comprising; a generally cylindrical member rigidly secured to said spindle assembly and having an annular and outwardly facing groove formed therearound, said groove being formed by a pair of transverse side walls, at least one of said walls having an annular recess therearound, a series of balls rigidly mounted around said member and in said groove, said balls also located in said side wall recess to prevent radial displacement of the balls with adjacent balls abutting against one another, and a plunger shiftably mounted on said housing and having a portion insertable tightly between adjacent balls to thereby prevent rotation of said mechanism and assembly relative to said housing.

4. An index mechanism for a chuck of the type having a housing and a spindle assembly rotatably mounted in said housing and adapted to grip a workpiece for rotation therewith, said mechanism comprising; a generally cylindrical member rigidly secured to said spindle assembly, a series of balls rigidly mounted circumferentially around said member with adjacent balls abutting against one another, a plunger shiftably mounted on said housing and having a portion insertable tightly between adjacent balls and into engagement therewith to thereby prevent rotation of said mechanism and assembly relative to said housing, a series of index marks arranged circumferentially around said member and correlated with said balls, and a reference mark on said housing and with which said index marks are selectively alignable.

5. An index mechanism for a chuck of the type having a housing and a spindle assembly rotatably mounted in said housing and adapted to grip a workpiece for rotation therewith, said mechanism comprising; a generally cylindrical member rigidly secured to said spindle assembly and having a groove formed around its periphery, a series of balls rigidly mounted in said groove and with adjacent balls abutting against one another, a plunger shiftably mounted on said housing and having a portion insertable tightly between and against adjacent balls to thereby prevent rotation of said assembly relative to said housing, a series of index marks arranged circumferentially around said member and correlated with said balls, and a reference mark on said housing and with which said index marks are selectively alignable.

6. In a chuck of the type having a housing and a spindle assembly rotatably mounted in said housing and adapted to grip a workpiece for rotation therewith, an index mechanism comprising; a generally cylindrical member secured to said spindle assembly for rotation therewith, a series of balls rigidly mounted next to one another and circumferentially around said member, and a plunger shiftably mounted on said housing and insertable between adjacent balls to thereby prevent rotation of said assembly.

7. A chuck comprising, a housing, a spindle rotatably mounted in said housing, a collet in said spindle and adapted to grip a workpiece for rotation therewith, a collet adjusting member secured to said collet and extending axially therefrom; an index mechanism comprising, a generally cylindrical member secured to said spindle for rotation therewith, a series of balls rigidly mounted next to one another and circumferentially around said member, a plunger shiftably mounted on said housing and insertable between adjacent balls to thereby prevent rotation of said assembly; said adjusting member extending through said spindle and cylindrical member, and interengaging and releasable means between said adjusting member and said cylindrical member whereby the former can be selectively adjusted relative to the latter to thereby shift said collet.

8. In a chuck of the type having a housing and a spindle assembly rotatably mounted in said housing and adapted to grip a workpiece for rotation therewith, an index mechanism comprising; a generally cylindrical member secured to said spindle assembly for rotation therewith, a series of balls rigidly mounted next to one another and circumferentially around said member, a plunger shiftably mounted on said housing and insertable between adjacent balls to thereby prevent rotation of said assembly, a series of index marks arranged circumferentially around said member and correlated with said balls, and a reference mark on said housing and with which said index marks are selectively alignable.

9. A chuck comprising, a housing, a spindle rotatably mounted in said housing, a collet in said spindle and adapted to grip a workpiece for rotation therewith, a collet adjusting member secured to said collet and extending axially therefrom; an index mechanism comprising, a generally cylindrical member secured to said spindle for rotation therewith, a series of balls rigidly mounted next to one another and circumferentially around said member, a plunger shiftably mounted on said housing and insertable between adjacent balls to thereby prevent rotation of said assembly; said adjusting member extending through said spindle and cylindrical member, interengaging and releasable means between said adjusting member and said cylindrical member whereby the former can be selectively adjusted relative to the latter to thereby shift said collet, a series of index marks arranged circumferentially around said member and correlated with said balls, and a reference mark on said housing and with which said index marks are selectively alignable.

References Cited in the file of this patent

UNITED STATES PATENTS

| | | |
|---|---|---|
| 2,233,950 | Lepetit | Mar. 4, 1941 |
| 2,267,647 | Ghaye | Dec. 23, 1941 |
| 2,908,195 | Benes | Oct. 13, 1959 |